United States Patent [19]
Doluca

[11] Patent Number: 5,528,132
[45] Date of Patent: Jun. 18, 1996

[54] METHOD AND APPARATUS FOR INCREASING SWITCHING REGULATOR LIGHT LOAD EFFICIENCY

[75] Inventor: Tunc Doluca, Saratoga, Calif.

[73] Assignee: Maxim Integrated Products, Sunnyvale, Calif.

[21] Appl. No.: 201,908

[22] Filed: Feb. 25, 1994

[51] Int. Cl.$^6$ ................................................ G05F 1/44
[52] U.S. Cl. .......................... 323/284; 323/901; 363/49
[58] Field of Search .................................. 323/273, 274, 323/282, 303, 266, 284, 285, 275, 279, 901; 363/49

[56] References Cited

U.S. PATENT DOCUMENTS

| | | | |
|---|---|---|---|
| 3,909,696 | 9/1975 | Katou et al. | 363/321 |
| 4,236,198 | 11/1980 | Ohsawa et al. | 363/21 |
| 4,644,247 | 2/1987 | Burmenko | 323/269 |
| 4,962,349 | 10/1990 | Albach et al. | 323/901 |

*Primary Examiner*—Peter S. Wong
*Assistant Examiner*—Shawn Riley
*Attorney, Agent, or Firm*—Blakely, Sokoloff, Taylor & Zafman

[57] ABSTRACT

A method and apparatus for increasing the light load efficiency of a DC-DC converter by reducing the quiescent power of the control section. In accordance with the invention, the DC-DC conversion is first started using a first regulator circuit to power the converter controller. When the converter output reaches an adequate level, the converter controller power input is switched to the output of the converter. At the same time, the first regulator circuit is turned off, whereby the converter controller continues to operate from the converter output, which has a voltage substantially less than the power supply input voltage. Because controllers all draw about the same current, the lower input voltage to the controller lowers the power consumption thereof, improving the efficiency of the regulator, particularly when subjected to light loads. Various embodiments are disclosed.

13 Claims, 2 Drawing Sheets

METHOD AND APPARATUS FOR INCREASING SWITCHING REGULATOR LIGHT LOAD EFFICIENCY

BACKGROUND OF THE INVENTION

1. Field of the Invention

The present invention relates to the field of electric power converters, and more particularly high frequency switching DC-DC converters.

2. Prior Art

Switch-mode topologies are widely used to convert power supply voltages from one value to another (DC-DC conversion). This function is mostly desirable when high efficiencies are required for lower power consumption or lower heat generation, such as, by way of example, in battery operated systems. Also battery operated and other modern systems tend to automatically shut down system facilities when not being used, both to conserve power and to reduce heat generation. Consequently such systems are often operating at substantially less than maximum capability, giving rise to another more recent requirement of such power supplies, namely good efficiency at load currents substantially lower than the rated current of the DC-DC converter.

When the load current is low, the efficiency of a switching converter is determined by losses due to the switching as well as power used by the control circuitry. In general, the power used by the control circuitry is derived from the input source.

FIG. 1 shows a very common DC-DC converter topology known as the step-down, or buck, topology. In this case, a high input voltage VIN, say 20 V, is converted to a low input voltage VOUT, say 5 V. In most cases the controller is powered from a linear regulator output voltage VR that is derived from the input power source voltage. Almost all controllers draw a relatively constant current. Therefore the power dissipation of the controller is given as:

Pd=VIN*Ic where:

Pd=power dissipation

VIN=the voltage of the input power source, and

Ic=the controller current

The purpose of the present invention is to reduce the controller power consumption, thereby increasing the regulator efficiency, particularly at low loads. Furthermore, the invention reduces power dissipation in the controller for less heat generation.

BRIEF SUMMARY OF THE INVENTION

The invention disclosed herein constitutes methods and apparatus for increasing the light load efficiency of a DC-DC converter by reducing the quiescent power of the control section. In accordance with the invention, the DC-DC conversion is first started using a first regulator circuit to power the converter controller. When the converter output reaches an adequate level, the converter controller power input is switched to the output of the converter. At the same time, the first regulator circuit is turned off, whereby the converter controller continues to operate from the converter output, which has a voltage substantially less than the power supply input voltage. Because controllers all draw about the same current, the lower input voltage to the controller lowers the power consumption thereof, improving the efficiency of the regulator, particularly when subjected to light loads.

DETAILED DESCRIPTION OF THE INVENTION

The invention disclosed herein constitutes methods and apparatus for increasing the light load efficiency of a DC-DC converter by reducing the quiescent power of the control section. In accordance with the invention, the DC-DC conversion is first started using a first regulator circuit to power a converter controller. When the converter output reaches an adequate voltage level, the converter controller power input is switched to the output of the converter. At the same time, the first regulator circuit is turned off, whereby the converter controller continues to operate from the converter output, which has a voltage substantially less than the power supply input voltage.

Since the controller runs at a substantially lower voltage than the input, the controller can be designed to run at the lower output voltage, say 5 V. After the controller is switched to derive power from the output voltage once it is available, the power dissipation will be:

Pd=VOUT*Ic where:

VOUT=the output voltage of the power converter

Assuming that VIN>>VOUT, the power dissipated in the controller is reduced by a factor of VOUT/VIN if the DC-DC converter efficiency is very high.

Figure 1:
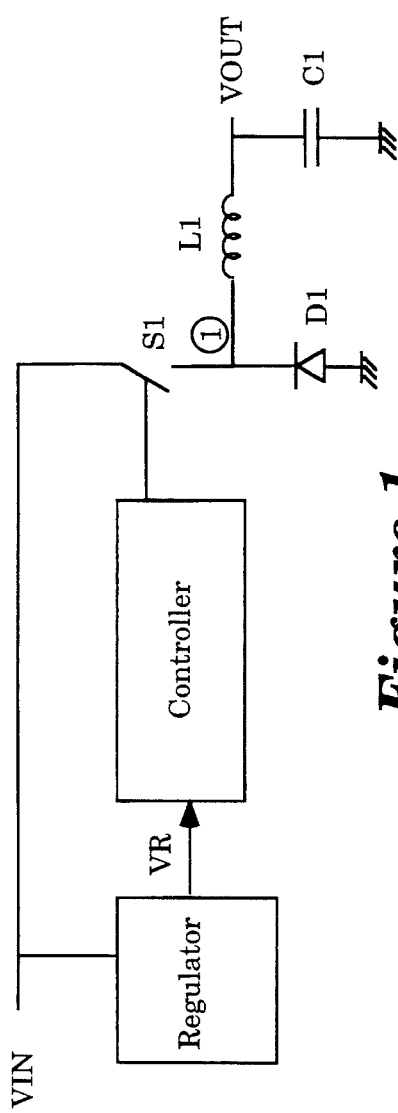
FIG. 1 is a schematic diagram of a common DC-DC converter topology known as the step-down, or buck, topology.
Figure 2:
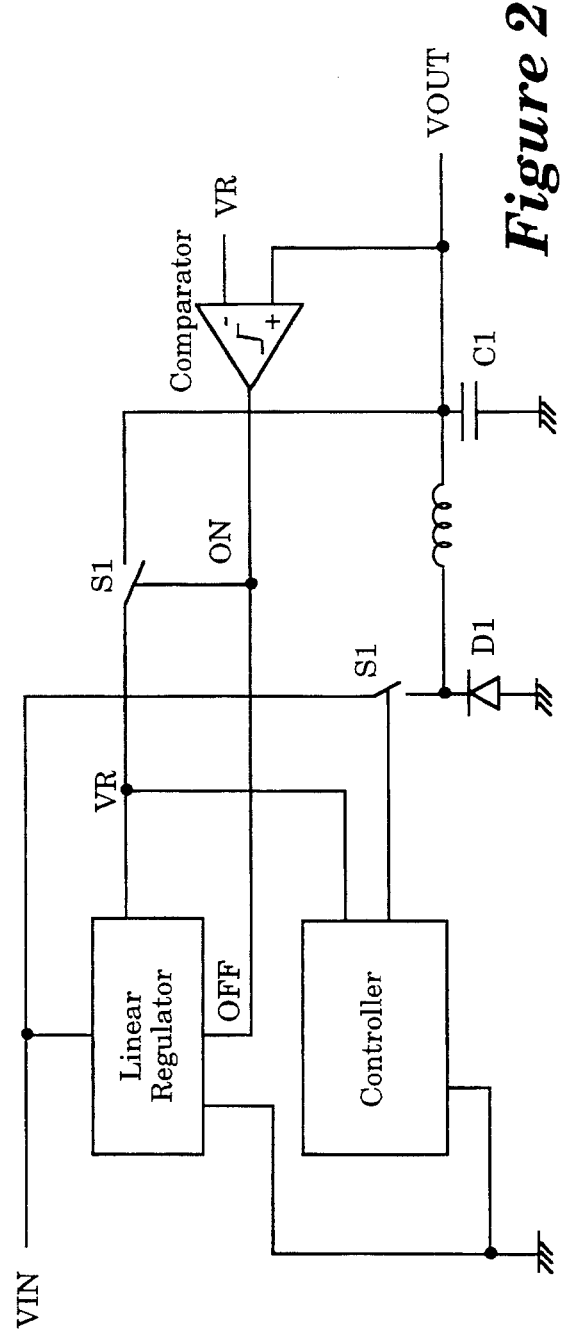
FIG. 2 is a schematic diagram of the preferred embodiment of the present invention.

The preferred embodiment of the invention is shown in FIG. 2. The linear regulator initially powers the controller as shown. The comparator monitors the output voltage, VOUT, comparing the same with a predetermined reference level V1. So long as the output of the converter is below V1, the output of the comparator remains low, the linear regulator remains on and the controller remains powered by the linear regulator.

When the output voltage exceeds the preset value V1, the output of the comparator goes high, turning on switch S2, now powering the controller from the converter output VOUT and turning of the linear regulator.

Similarly, if VOUT later goes below the set voltage V1 for any reason, then the comparator output turns switch S2 off and the linear regulator is enabled. Therefore, the regulated voltage VR is always available to the controller regardless of the state of VOUT. However the power dissipated by the controller circuitry is reduced by the ratio VIN/VOUT.

Figure 3:
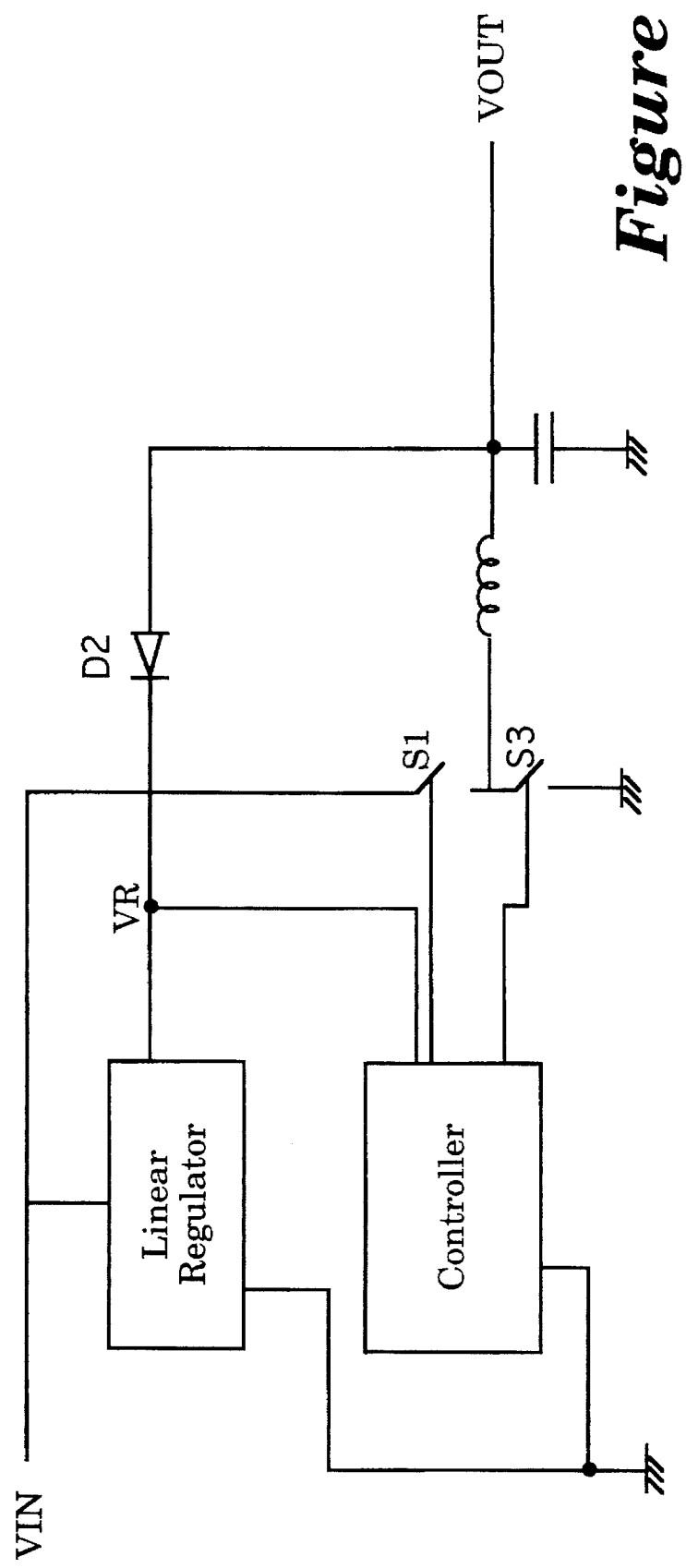
FIG. 3 is a schematic diagram of an alternate embodiment of the present invention.

FIG. 3 is a schematic diagram of an alternate embodiment of the present invention. In this Figure, the diode D1 of FIG. 2 has been replaced by an active switch S3, also controlled by the controller. Controllers of the general type illustrated in the embodiments of both FIG. 2 and 3 are well known, and accordingly details of a specific controller design are not provided. However, it should be noted that the controller in both embodiments is shown connected between the linear regulator output and ground. Actually the turning on and off of the linear regulator may well be by way of effecting the continuity of this power connection, as turning off the entire controller circuitry will conserve the most power. Also the linear regulator design should preferably be such that the same is capable of outputting current, but will not present a load to the output of the DC-DC converter either when the regulator is off, or in the event the same is not off, at any time that the output voltage of the DC-DC converter exceeds the output voltage of the regulator. Also note in this embodiment that diode D2 is used in place of the comparator, with the rise of voltage of the diode connection to the regulator shutting off the regulator. However, if a diode is used, the output voltage must be higher than the regulated voltage by at least the forward conduction voltage drop of the diode, which does impose a restriction. Also in cases where the output voltage VOUT is substantially higher than the desired voltage VR, the switch S2 could also be another linear regulator.

Note that one skilled in the art can also implement a similar scheme for other topologies, like inverting DC-DC conversion. In the preferred embodiment of FIG. 2, the switch S1 is a p-channel MOSFET, though an n-channel instead of p-channel device could be used, or even a bipolar device of either conductivity type could be used. Thus, while the present invention has been disclosed and described with respect to a certain preferred embodiments thereof, it will be understood to those skilled in the art that the present invention may be varied without departing from the spirit and scope of the invention.

I claim:

1. A method of improving light load efficiency for a switching DC to DC converter having a DC input and a DC output, the method comprising the steps of:

providing a switch controller to control the switching DC to DC converter to control the voltage of the DC output of the DC to DC converter;

operating the switch controller from the DC input whenever the DC output is below a predetermined voltage; and operating the switch controller from the DC output of the DC to DC converter whenever the DC output rises above the predetermined voltage.

2. The method of claim 1 wherein the step of operating the switch controller from the DC input whenever the output is below a predetermined voltage comprises the step of operating the switch controller through a linear regulator coupled to the DC input.

3. The method of claim 2 further comprising the step of turning off the linear regulator when the switch controller is operating from the DC output.

4. A method of operating a step-down switching DC to DC converter which improves light load efficiency and converts a DC input to a DC output, the method comprising the steps of:

providing a switch coupled to the DC input and an inductor coupled between the switch and the DC output, a capacitor coupled to the DC output, and a circuit element coupled to the junction between the switch and inductor to allow current to continue to flow through the inductor toward the DC output immediately after the turnoff of the switch;

providing a switch controller to control the switch to control the voltage of the DC output of the DC to DC converter;

operating the switch controller from the DC input whenever the DC output is below a predetermined voltage; and operating the switch controller from the DC output whenever the DC output is above the predetermined voltage.

5. The method of claim 4 wherein the step of operating the switch controller from the DC input whenever the DC output is below the predetermined voltage comprises the step of operating the switch controller through a linear regulator coupled to the DC input.

6. The method of claim 5 further comprising the step of turning off the linear regulator when the switch controller is operating from the DC output.

7. A switching DC to DC converter for converting a DC input to a DC output and for improving light load efficiency, the switching DC-to-DC converter comprising:

circuitry, coupled between the DC input and the DC output, including a switch for controlling the transfer of electrical power between the DC input and the DC output;

a switch controller to control the switch to control the voltage of the DC output of the DC to DC converter;

circuitry for operating the switch controller from the DC input whenever the DC output is below a predetermined voltage; and circuitry for operating the switch controller from the DC output whenever the DC output is above the predetermined voltage.

8. The switching DC to DC converter of claim 7 wherein the circuitry for operating the switch controller from the DC input whenever the DC output is below the predetermined voltage comprises a linear regulator coupled to the DC input.

9. The switching DC to DC converter of claim 8 further comprising circuitry for turning off the linear regulator when the switch controller is operating from the DC output.

10. An integrated circuit for use as part of a switching DC to DC converter for improving light load efficiency and for converting a DC input to a DC output, the integrated circuit comprising:

a switch controller for controlling the voltage of the DC output of a DC to DC converter; and, circuitry for operating the switch controller from the DC input whenever the DC output is below a predetermined voltage; and circuitry for operating the switch controller from the DC output whenever the DC output is above the predetermined voltage.

11. The integrated circuit of claim 10 further comprises a regulator coupled to the DC input, the regulator providing the power input to the switch controller.

12. The integrated circuit of claim 11 wherein the regulator is a linear regulator.

13. The integrated circuit of claim 12 further comprises a switch for controlling the transfer of electrical power between the DC input and the DC output.

\* \* \* \* \*